UNITED STATES PATENT OFFICE.

GEORGE H. EARP-THOMAS, OF GLEN RIDGE, NEW JERSEY, ASSIGNOR OF ONE-HALF TO HENRY KING HANNAH, OF MONTCLAIR, NEW JERSEY.

FERTILIZER COMPOSITION AND PROCESS OF MAKING SAME.

1,212,196.  Specification of Letters Patent.  Patented Jan. 16, 1917.

No Drawing. Application filed November 10, 1914, Serial No. 871,291. Renewed October 28, 1916. Serial No. 128,345.

*To all whom it may concern:*

Be it known that I, GEORGE H. EARP-THOMAS, a citizen of New Zealand, residing at Glen Ridge, in the county of Essex and State of New Jersey, have invented certain new and useful Improvements in Fertilizer Compositions and Processes of Making Same, of which the following is a specification.

My invention relates to a new and useful improvement in a composition to be used as a fertilizer, a fertilizer filler, an artificial manure, or a carrier of beneficial soil bacteria.

One of the principal ingredients of the composition is *Zostera marina*, or what is commonly known as eel grass.

It is of course understood that heretofore there has been little or no market for eel grass, so that the cost of the same is simply that of harvesting.

I have found that eel grass can be used with many minerals possessing fertilizing value to produce an excellent fertilizer, the eel grass acting as a decomposing agent in producing sufficient acid to decompose minerals, especially phosphate rock, and suitably taking the place of the expensive acidulating process which this rock has heretofore been put to before being made into a commercial fertilizer.

The eel grass is ground very finely, for the purpose of acting as a decomposing agent with decomposing bacteria, such as ammoniafying bacteria, nitrifying bacteria, nitrogen fixing bacteria, and other bacteria, so that when the same is thoroughly mixed with raw finely ground rock phosphate, the resultant composition will be in an available and desirable condition, when placed in the soil, for the nurturing of the crops. It will also be understood that it can be mixed with compounds of potassium and nitrogen, and in suitable proportions to thereby form a complete fertilizer of any desired formula.

It will be understood that the greatest value of my invention is the mixing of the phosphate rock with the eel grass to thereby decompose the phosphate rock, and in this manner doing away with the necessity of the acidulating process to which the rock is now subjected, the eel grass acting as a novel and suitable medium for converting the rock into a useful and available condition. I also find a new use for humus, muck or peat which has a similar action to the eel grass. It can be used alone with the rock phosphate as a decomposing agent and as a food for bacteria, or it may be mixed with eel grass in varying proportions for the same purpose. The eel grass has the advantage in this mixture of adding a large percentage of compounds of potassium, sodium and some other elements which possess fertilizing value so that the peat is more readily acted upon by the bacteria. It will be understood that the proportions vary and the mixture of fifty per cent. of the eel grass and phosphate rock have been found very suitable, or a mixture of muck and eel grass and phosphate rock may be made.

Having thus described my invention what I claim and desire to secure by Letters Patent is:—

1. The process of forming a fertilizer, which consists in grinding eel grass, grinding phosphate rock, and thoroughly mixing the same.

2. The process of forming a fertilizer, which consists in grinding eel-grass, grinding phosphate rock, thoroughly mixing the same together, and mixing humus therewith.

3. A fertilizer containing humus-forming material, eel-grass and additional amounts of phosphate, and compounds of potassium and nitrogen.

4. A fertilizer containing eel-grass and additional amounts of phosphate, and compounds of potassium and nitrogen.

5. A fertilizer comprising ground eel-grass and additional amounts of phosphate, and phosphate rock.

In testimony whereof I affix my signature in presence of two witnesses.

GEORGE H. EARP-THOMAS.

Witnesses:
HOWARD B. DAVIS,
T. H. LAWRY.